United States Patent [19]
Ruppel

[11] Patent Number: 5,109,936
[45] Date of Patent: May 5, 1992

[54] DYNAMIC WEIGHT CONTROL SYSTEM

[75] Inventor: Robert F. Ruppel, Glen Cove, N.Y.

[73] Assignee: Cahin Systems Corporation, Mokena, Ill.

[21] Appl. No.: 605,736

[22] Filed: Oct. 30, 1990

Related U.S. Application Data

[63] Continuation-in-part of Ser. No. 373,091, Jun. 28, 1989, abandoned.

[51] Int. Cl.⁵ .................. G01G 19/40; G01G 19/52
[52] U.S. Cl. ................................. 177/25.19; 177/50
[58] Field of Search .......................... 177/25.19, 50

[56] References Cited

U.S. PATENT DOCUMENTS

| | | | |
|---|---|---|---|
| 3,862,666 | 1/1975 | Muskat et al. | 177/50 |
| 4,065,911 | 1/1978 | Fagan | 177/25.19 |
| 4,794,996 | 1/1989 | Wallace et al. | 177/50 X |
| 4,972,882 | 11/1990 | Kohashi | 177/25.19 X |

Primary Examiner—George H. Miller, Jr.
Attorney, Agent, or Firm—Kinzer, Plyer, Dorn, McEachran & Jambor

[57] ABSTRACT

The present invention relates to a dynamic weight control system for a slicing machine, used to slice bacon or other food products, that has both primary and secondary weighing systems. The slicing machine has a slicing blade and a feed mechanism for feeding a food product (e.g., a bacon slab) into the slicing blade at a controlled rate. The primary weighing system controls primary slicing and weighing of multi-slice drafts of the sliced products so that each draft is an approximation of a prescribed control weight. The secondary weighing system checks draft weights and supplies data to a computer that computes an average weight for those drafts that are within an acceptable weight range; it also computes the pass ratio of acceptable weight drafts for a sample group of drafts. The pass ratio computation is ueed to make incremental adjustments in a target weight and the second system then computes a dynamic weight correction based on the adjusted target weight; the weight correction is fed back into the primary weighing system where it is used to adjust the control weight, with no operator intervention required, to reduce weight giveaway.

30 Claims, 4 Drawing Sheets

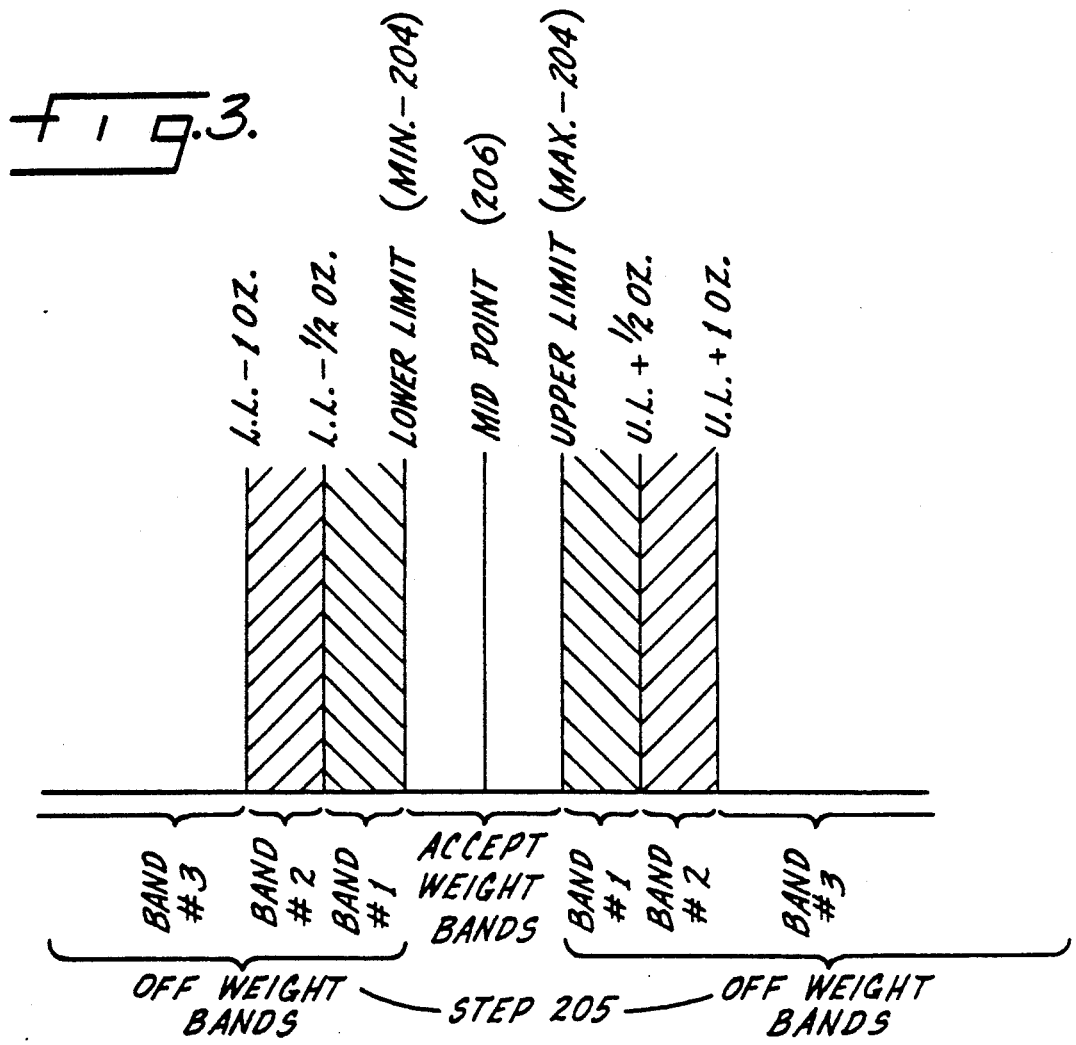
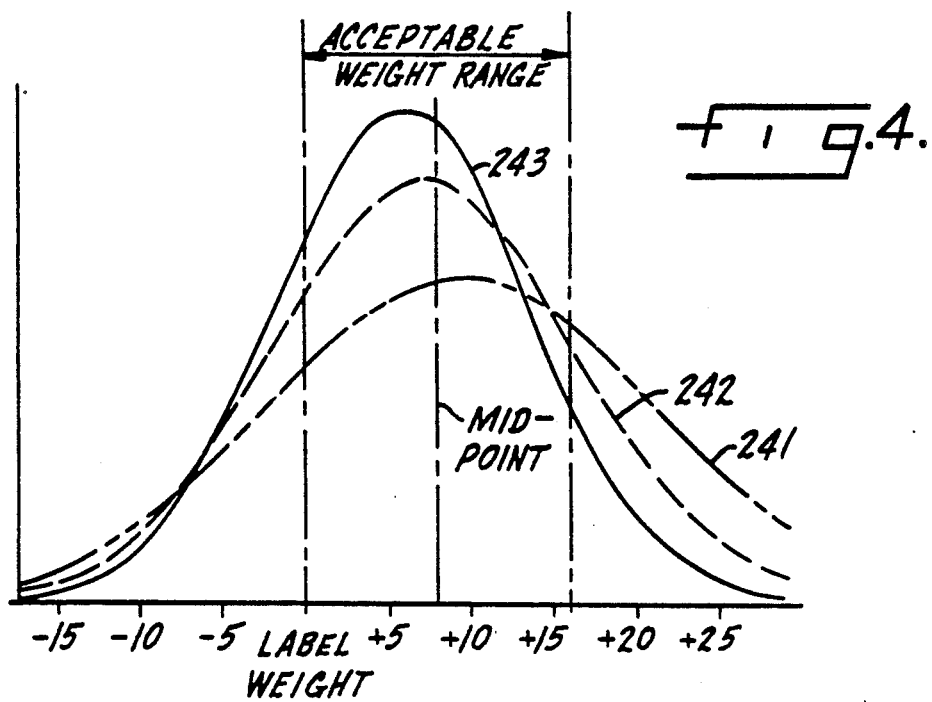

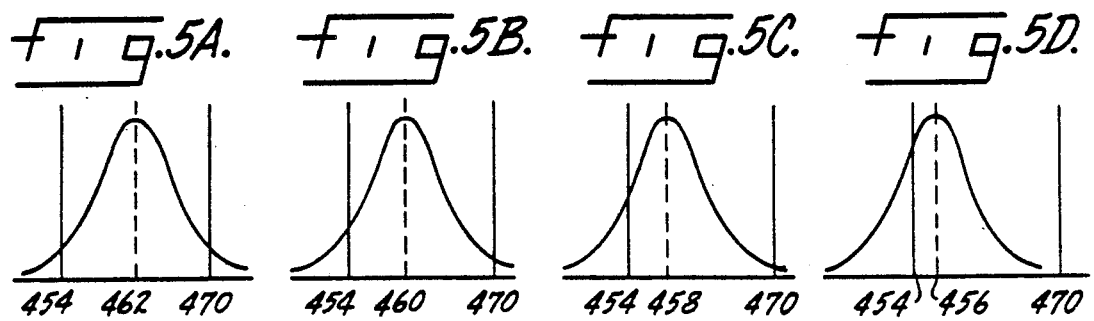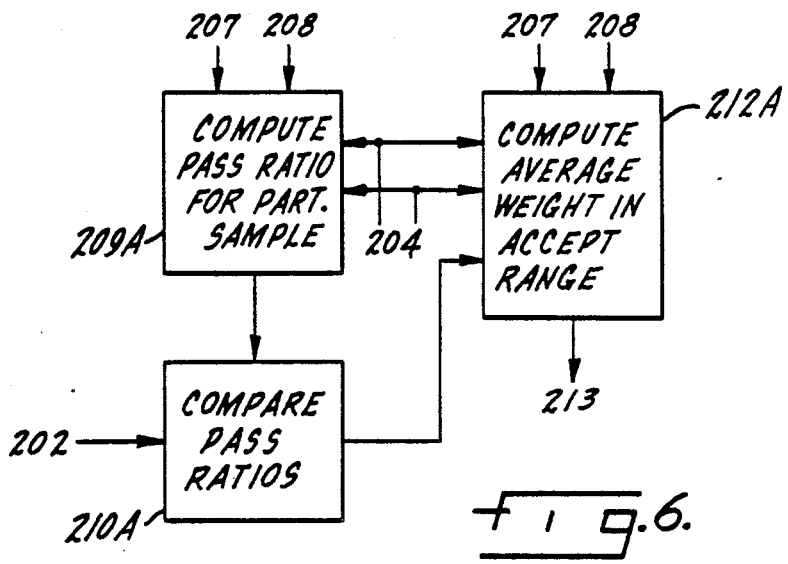

DYNAMIC WEIGHT CONTROL SYSTEM

RELATION TO PRIOR APPLICATION

This patent application is a continuation-in-part of the inventor's prior application Ser. No. 07/373,091 filed Jun. 28, 1989, and now abandoned.

BACKGROUND OF THE INVENTION

The present invention relates to a combination slicing and weighing machine for food products, particularly variable food products such as bacon. The invention relates to a dynamic weight control system, so called because the desired weight of each multi-slice draft of the product is varied depending on the dynamics of the slicing conditions The invention usually has both a primary control system and a secondary control system, with feedback from the secondary system to the primary system.

FIELD OF THE INVENTION

Many slicing and weighing machines are known in the prior art. The commonly assigned U.S. Pat. No. 4,065,911 discloses a combination bacon slicing and weighing apparatus having both a primary and a secondary weighing system. U.S. Pat. No. 4,065,911, which focusses on the primary system, discloses a bacon weigher wherein a slicing machine includes controls for controlling the feed rate of the bacon as it advances to the slicing blade; in that way, the slice thickness is controlled. This system determines the weight correction required at an intermediate stage in slicing a multi-slice draft from a slab of bacon (or other food product), then uses that correction to adjust the balance of the draft to achieve a preset overall draft weight, with compensation in weight based in part upon slice thickness. The system uses a secondary or check weigh scale to identify and reject out-of-tolerance drafts. Overall, the system affords a major reduction in excess weight ("weight giveaway") in the completed bacon drafts, as compared with other control systems.

However, U.S. Pat. No. 4,065,911 does not disclose use of a secondary weighing (check weigh) and control system for checking draft weights and computing a weight correction for automated adjustment of a variable target weight, based on the average weight of multi-slice drafts within an acceptable weight range, and on a percent of acceptable weight drafts, for a sample group of drafts, and providing this weight correction by feedback to the primary weighing system to further reduce system weight giveaway by adjusting a control weight to modify succeeding drafts, as in the present invention. Thus, the present invention provides a control for a combination slicing and weighing machine, controlling the slicing and weighing of bacon or other products by means of feedback correction signals. Those signals are based on the actual number of drafts in an acceptable weight range, used to adjust a target draft weight prior to comparing that adjusted target weight with an actual average draft weight. Thereafter, the result of the comparison is used to modify a primary control weight.

SUMMARY OF THE INVENTION

It is a principal object of the invention, therefore, to provide a new and improved dynamic weight control system for a slicing machine for slicing bacon and other food products that automatically adjusts the target weight, for multi-slice drafts of the sliced product, on an incremental basis, and then employs the adjusted target weight to minimize weight giveaway.

A further object of the invention is to provide a new and improved dynamic weight control system for a food product slicing machine that adjusts the overall percentage of multi-slice drafts coming within an acceptable weight range to a minimum to maximize the reduction in weight giveaway.

Another object of the invention is to provide a new and improved dynamic weight control system for a food product slicing machine that provides both short-term and long-term automated weight control based on determinations of the average weights of quantities of multi-slice drafts, on the percentage of drafts in an acceptable weight range, on an unacceptable weight for a limited number of consecutive drafts, and on substantial variation in system performance at startup.

Accordingly, the invention, in one aspect, relates to a method of controlling the slicing of a food product; that method comprises the following steps:

A. recording a target weight and a related control weight for a multi-slice draft of the product;

B. advancing a food product into a slicing station at a predetermined feed rate;

C. slicing the food product, in the slicing station, to produce a series of multi-slice product drafts;

D. adjusting the feed rate of step B, when necessary, during slicing of each draft, to maintain the total weight of most of the drafts within a preselected permissible weight range above and below the target weight;

E. weighing each draft after its completion;

F. counting the number N of acceptable drafts, in a predetermined sample number of S drafts, that are within an acceptable weight range above and below the target weight;

G. computing an actual pass ratio N/S;

H. adjusting the target weight downwardly by a target weight reduction increment when the actual pass ratio of step G exceeds a pre-recorded desired pass ratio;

I. determining the average weight of the actual acceptable drafts in the sample of steps F;

J. comparing the adjusted target weight of step H with the average weight of step J to determine the difference therebetween; and K. adjusting the control weight in accordance with the difference from step J.

In another aspect, the invention relates to a dynamic weight control system for a slicing machine of the kind comprising a slicing station for slicing a food product to produce a series of multi-slice product drafts, feed means for feeding a food product into the slicing station at a given feed rate, control weight means for recording a control weight for a product draft, and a primary weight control, including primary weighing means, for controlling the feed means to maintain the weights of most of the drafts in a preselected permissible weight range above and below the control weight, the dynamic control system comprising:

secondary weighing means for weighing each draft after its completion;

computer means, connected to the secondary weighing means, for:

(a) recording a target weight for a product draft, which target weight is related to the control weight;

(b) determining the number N of acceptable drafts, in a predetermined sample number S of drafts, that are actually within a predetermined acceptable weight range above and below the target weight;

(c) computing an actual pass ratio N/S;

(d) comparing that actual pass ratio with a prerecorded desired pass ratio;

(e) adjusting the target weight downwardly by a target weight reduction increment when the comparison indicates that the actual pass ratio exceeds the prerecorded desired pass ratio;

(f) determining the average weight of the acceptable drafts in the sample;

(g) and comparing the adjusted target weight of step (e) with the average weight of step (f) to generate a weight difference signal indicative of the difference therebetween; and control weight adjustment means, connected to the computer means and to the control weight means, for adjusting the control weight in accordance with the difference signal.

BRIEF DESCRIPTION OF THE DRAWINGS

For a fuller understanding of the nature and the objects of the invention, reference should be had to the following detailed description, taken in connection with the drawings in which:

FIG. 3 is a bar graph showing the off-weight bands for the system;

FIG. 4 is a chart of draft weight distribution used to explain operation of the system;

FIGS. 5A through 5D are additional charts of a draft weight distribution used to further explain system operation; and FIG. 6 is a flow chart for a modification of the system.

DESCRIPTION OF THE PREFERRED EMBODIMENT

Figure 1:
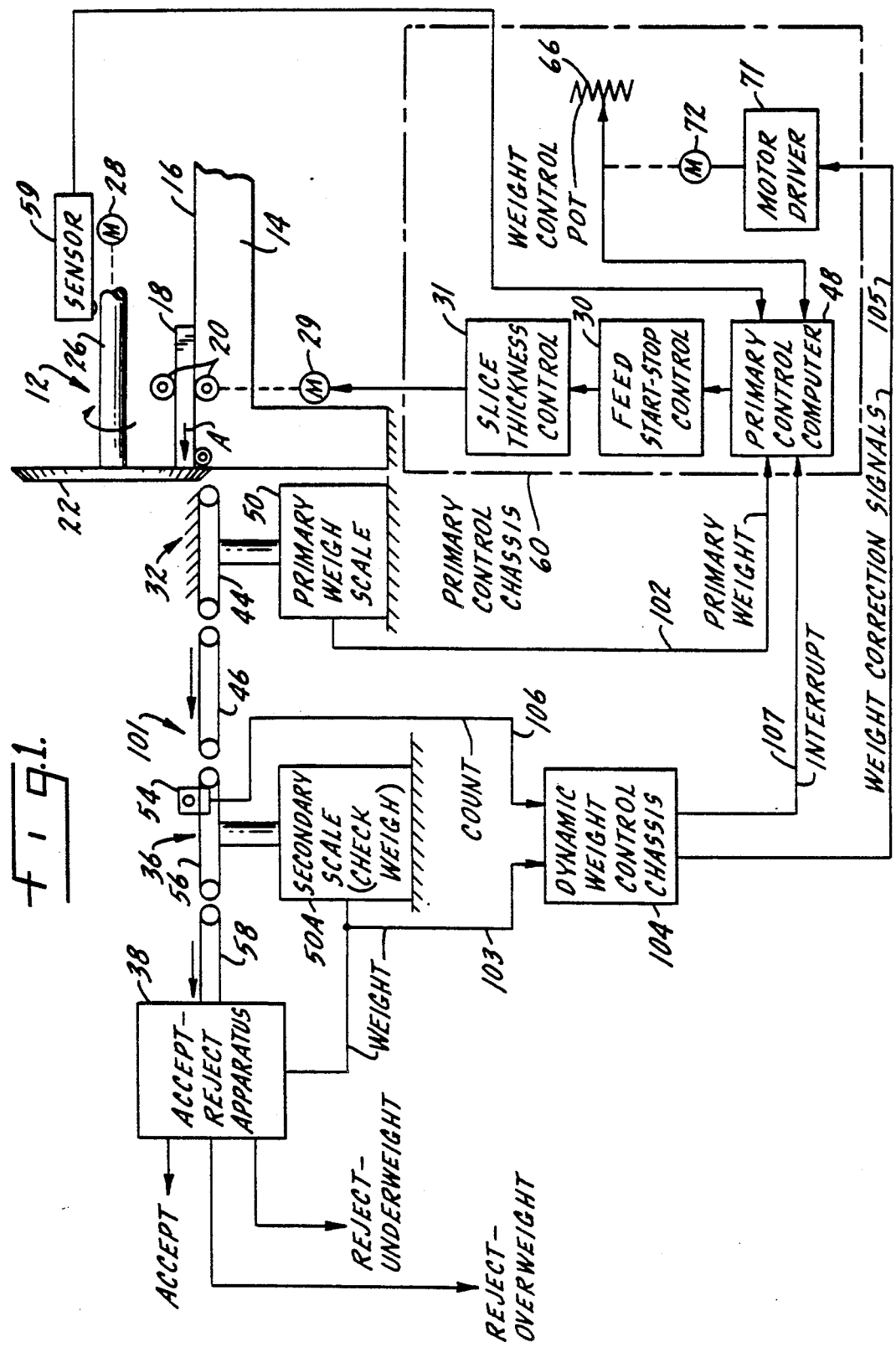
FIG. 1 is an overall schematic view of a bacon slicing machine incorporating a dynamic weight control system according to one embodiment of the present invention.

FIG. 1 affords an illustration of a slicing machine 12 to which the dynamic weight control system 101 of the present invention may be applied. Thus, slicing machine 12 may have the construction disclosed in any of previous U.S. Pat. Nos. 2,903,032, No. 2,969,099, No. 3,027,924, No. 3,846,957, or No. 3,846,958. Slicing machine 12 may also be any of a number of other widely varied bacon slicing machines. It is preferred that the slicing machine 12 be of the continuous feed type, such as those well known in the art and depicted generally in prior U.S. Pat. Nos. 3,354,920 and No. 3,880,035. The slicing machine 12 is not described in detail; for a more complete explanation, reference may be made to the foregoing patents.

In the simplified form shown in FIG. 1, the slicing machine 12 comprises a supporting table 14 having a platen or feed bed 16 over which a food product, such as a bacon slab 18, is fed by a conveyor or other feed mechanism 20. The bacon slab 18 is sliced by a rotating blade 22 driven by a shaft 26 in turn driven by a motor 28. Slices of bacon cut by blade 22 are discharged to a measuring and segregating apparatus generally represented by reference numeral 32. Normally the forward or leading edge of the bacon slab or other food product 18, the left hand edge as shown in FIG. 1, is pressed downwardly against the bed 16 so it will be properly engaged by the blade 22. This may be accomplished by appropriate means such as a spring pressure plate (not shown). In the commercially available slicing machines referred to above the blade 22 is usually an involute disc which rotates at high speeds.

The feed mechanism 20 for bacon or belly slab 18 is driven by a motor 29 that is controlled by a slice thickness control 31, which may be of conventional construction. Slice thickness control 31 is of a type that adjusts the thickness of the slice by increasing or decreasing the rate of travel of slab 18 as urged in the direction of arrow A by mechanism 20.

The measuring and segregating apparatus 32 is adapted to receive slices from machine 12 and arrange them in shingled fashion. Apparatus 32 may also segregate the food product slices into groups or drafts by momentarily interrupting the feeding of a conveyor 44. The measuring and segregating apparatus 32, which constitutes a food product weighing station, is aligned with a check weighing station 36 and a rejection/acceptance station 38. These stations are linked by successive conveyors 44, 46, 56 and 58, the latter leading into the accept/reject apparatus or station 38.

The input end of conveyor 44, which is a relatively high speed weighing conveyor, is located adjacent the discharge end of the slicing machine 12 in position to receive individual slices cut by blade 22. The cut slices are shingled as a result of the movement of conveyor 44. When a predetermined weight of slices has been accumulated on conveyor 44 they are transferred to conveyor 46 and then to the conveyor 56 in the check weighing station 36. The weighing conveyor 44 is supported by a scale 50. The conveyor 44 may be of the adjustable variety disclosed in prior U.S. Pat. No. 4,969,099 and preferably is adapted to accommodate at least two different draft weights. Conveyor 44 may also incorporate the construction disclosed is U.S. Pat. No. 3,200,864, which travels at a low speed during the depositing of slices thereon and at an increased speed after the weight is registered by scale 50, so that each draft is removed in a minimum period of time.

At the check weighing station 36, a conveyor 56 receives the grouped, shingled slices traveling into the station on conveyor 46. A suitable sensing means such as a photoelectric detector 54 is located at the station 36, as is a secondary scale 50A which registers the weight of each group or draft of slices traversing conveyor 56. If the scale 50A detects a draft which is above or below a preset acceptable range for draft weights, a reject signal generated by the scale is transmitted to the accept/reject station 38. That particular out-of-tolerance draft is then diverted to a reject position, as it leaves station 38, for adjustment of weight. There may be two reject locations, one for underweight drafts and the other for overweight drafts. A reject mechanism is disclosed in prior U.S. Pat. No. 3,200,864.

In the apparatus illustrated in FIG. 1, the position of the rotary cutting blade 22 is detected by a sensor 59. Any one of a variety of sensing mechanisms may be employed for this purpose. The output from sensor 59 is connected to the primary control chassis 60.

The primary control chassis 60, which in most respects corresponds to the control apparatus disclosed in prior U.S. Pat. No. 4,065,911, includes a primary control computer 48 that receives an input from the blade position sensor 59. The principal input to the primary control computer 48, however, is from the primary weight scale 50. The computer 48 also receives another input from a weight control device 66, shown as a potentiometer because this is usually the preferred construction for this portion of the system. The output of the primary control computer is connected to a feed start-stop control circuit 30 that is in turn connected to the slice thickness control 31.

As thus far described, slicing machine 12 and its primary control system 50, 60 are essentially similar to the primary weight control apparatus for a food product slicing machine that is disclosed in substantially greater detail in prior U.S. Pat. No. 4,065,911. Accordingly, only a brief description of the operation of the system, as regards the primary control of chassis 60, is provided herein.

In operation of the apparatus of FIG. 1, as thus far described, the belly or bacon slab 18 is sliced, at a preselected thickness, by rotating blade 22, until a preselected portion, usually about 75%, of a draft (i.e., 12 oz. for a 16 oz. draft) has been sliced. At this point the slicing operation is interrupted by stopping the feeding apparatus 20, through the operation of sensor 59, computer 48, and start-stop control 30. When the feed mechanism 20 stops and slicing is interrupted, the scale 50 is allowed to settle until a stable weight reading is obtained. That weight reading is supplied, on a line 102, from the primary weighing scale 50 to the primary control computer 48.

The primary control computer mechanism 48 of chassis 60 uses the weight information supplied from scale 50 to determine the weight that must be added to the partial draft to produce a desired draft weight, sometimes referred to as the control weight. This is the weight that is established by weight control potentiometer 66. The remaining required weight for the draft is translated into the number of additional slices required; this calculation may include a partial slice and, because fractional slices are not desired, the calculation is rounded out to the nearest integer. To complete the draft, the slice thickness control is actuated to drive the feed means 20 for additional cycles of blade 22 to produce the requisite number of slices to complete the draft with the desired weight in an acceptable range determined by the setting of the weight control pot 66. When the draft is completed, the feed mechanism 20 is again interrupted for an interval sufficient to provide the desired spacing between drafts as deposited upon conveyor 44 in station 32.

In the primary control system as thus far described, the product required for addition to the draft during the second feed is calculated directly in number of slices and is a function of the average slice weight of the first feed. Moreover, the feed speed of the product (bacon 18) for the second feed is automatically adjusted so that an integral number of full slices (no partials) are added to make the required draft weight. Thus, the second feed distributes the required additional weight over an integral number of slices to minimize the deviation in slice thickness between the slices of the first feed and the second feed. The draft is then conveyed to the check weighing station 36 from which it is transferred on into the accept/reject apparatus 38. As previously noted, operation of apparatus 38 is controlled by weight signals supplied from the secondary or check weigh scale 50A.

The dynamic weight control system 101 of FIG. 1 includes a dynamic weight control chassis 104 that is connected, by a conductor 103, to the output of the secondary (check weigh) scale 50A. The dynamic weight control chassis 104 also has a second input derived from the photocell or other count detector 54 in station 36, as indicated by a conductor 106. The principal output of the dynamic weight control chassis 104 is shown as a signal line 105 that carries weight correction signals to a motor driver circuit 71. The motor driver circuit 71 actuates a motor 72, preferably a stepper motor, that is used to position the weight control potentiometer 66. There is an additional output 107 from the dynamic weight control chassis 104 to the primary control computer 48 in the primary control chassis 60. This is an interrupt output, described more fully hereinafter.

Figure 2:
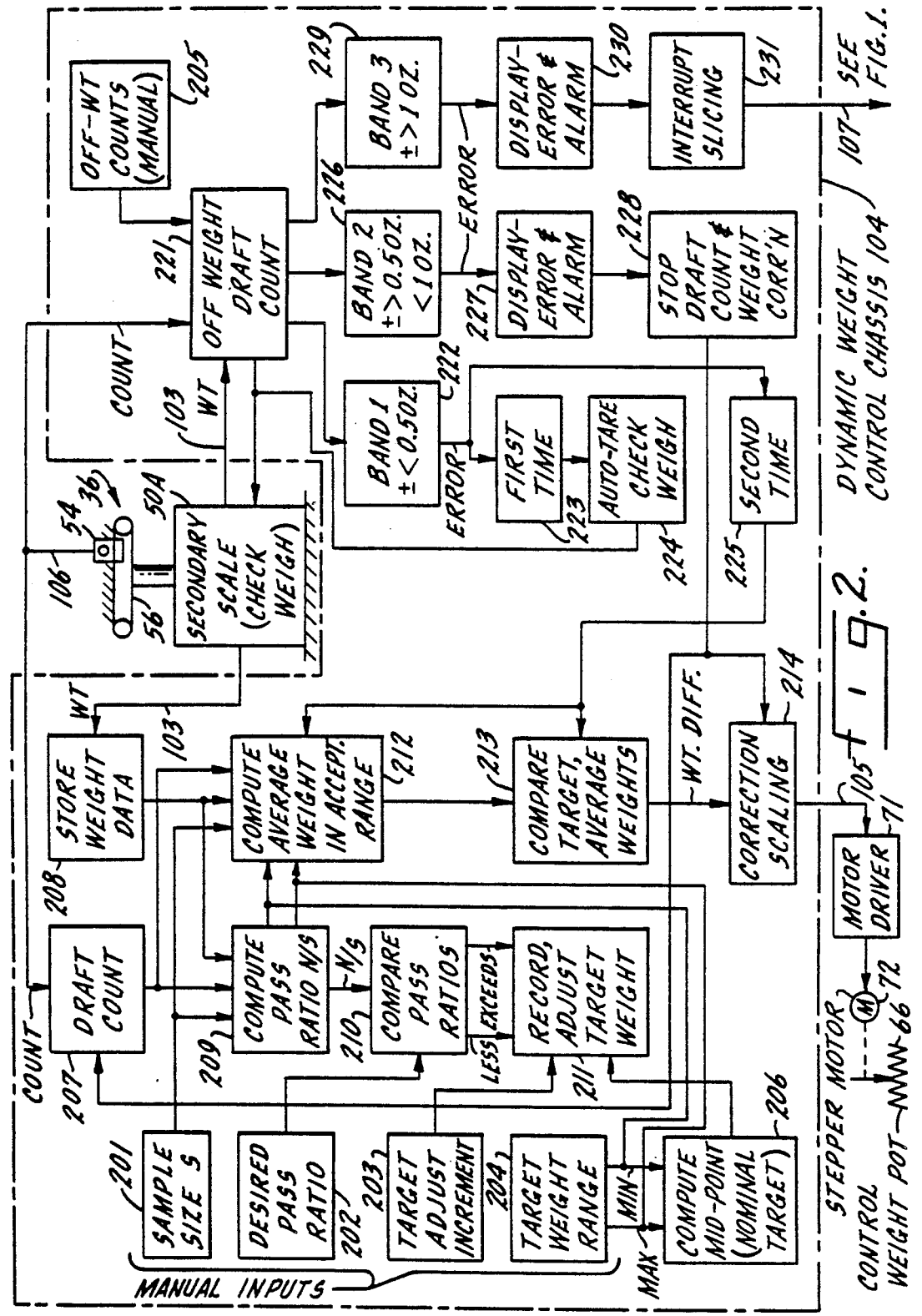
FIG. 2 is a flow chart for operation of the dynamic weight control system of FIG. 1, including the secondary weight scale (check weigher), the associated feedback system, and the off-weight package count system of the present invention.

FIG. 2 affords a flow chart for the dynamic weight control chassis 104 of FIG. 1; the only apparatus shown in FIG. 2 is that of the secondary weighing or check weighing station 36. The subject matter for dynamic weight control chassis 104 is presented in flow chart form, in FIG. 2, because the basic operations can be performed by an appropriately programmed computer apparatus. Of course, the same operations can be carried out by a hand-wired control.

Before the dynamic weight control system comprising check weigher scale 50A and chassis 104 of FIG. 1 can be put into operation, it is first necessary to enter some reference data for use by the control system in its operations. In the flow chart there are five manual inputs, four located at the left hand side of FIG. 2. They include a manual input 201 for entry of a sample size into the dynamic weight control chassis. The sample size is a predetermined number of drafts, used for weight determinations, pass ratio determinations, and the like. The sample size S may be subject to substantial variation, but preferably is in a range of 50 to 150. In the examples set forth hereinafter, the sample size S is taken as 100 drafts.

Another manual input located at the left hand side of FIG. 2 is a desired pass ratio input 202. This may be calibrated as a simple ratio but preferably is calibrated as a percentage, because common practice in the industry is to consider the pass ratio as a percentage of drafts that are within an acceptable weight range. Again, the pass ratio set in by manual input 202 is subject to substantial variation. It may range from a high of more than 80% to 60% or even less.

The next manual adjustment 203 at the left hand side of FIG. 2 pertains to selection of a target weight adjustment increment. This target weight adjustment increment is usually a very small weight. For example, it may be as little as two grams or even one gram. In terms of ounces, the target weight adjustment increment set into the system through manual input 203 may typically be of the order of 0.05 oz. Of course, the increment selected is determined by the nature of the food product being sliced and overall operation of machine 12.

The last manual input at the left hand side of the flow chart, FIG. 2, is a target weight range input 204. As shown in FIG. 2, the target weight range is manually entered into dynamic weight control chassis 104 as two weight values, a minimum value and a maximum value. The minimum value is one below which the weight of a draft is quite unacceptable. For example, in cutting drafts to be packaged as 16 oz. packages of bacon, the minimum is 16 oz. or 454 grams. Below that weight, any package of the bacon would be short of the label weight and hence would be quite unacceptable.

The maximum weight value to be entered through the target weight input 204 is subject to more variation. Typically, it is less than one oz. higher than the minimum. Thus, as indicated in an example hereinafter, the maximum target weight for the acceptable range, for one pound bacon drafts, may be set at 16.6 oz. or 470 grams. However, as previously noted, this is subject to some variation. The target weight range manual input 204 is utilized for several purposes, as described hereinafter, in the operation of dynamic weight control chassis 104. When entered, it is utilized in step 206 to compute a nominal target weight as the mid point of the overall range defined by the maximum and minimum weight values entered through input 204. For maximum and minimum target weight range limits of 16 oz. (454 gm) and 16.6 oz. (470 gm.) the mid point is 462 gm. (16.3 oz.)

There is one more manual input to dynamic weight control chassis 104. This is an off-weight count input 205 which appears in the upper right hand corner of the flow chart of FIG. 2. That manual input will be discussed in greater detail in connection with the operations shown at the right hand side of FIG. 2, which pertain to what may best be termed unusual or emergency conditions. With inputs 201-205 all entered by the operator (the inputs may be at a common location on chassis 104) the dynamic weight control system of the present invention is ready for operation.

Each draft of bacon or other sliced food product, after completion by the slicing station 12, advances to the secondary weighing or check weigh station 36 and is weighed by the scale 50A. At the same time, passage of the draft through station 36 is noted by the detector 54. The total number of drafts passing through the secondary weighing station 36 is counted as indicated in a step 207 in the upper left hand corner of FIG. 2. The weight of each draft is also recorded, as indicated by the step 208. The draft count from step 207, the draft weight from step 208, the sample size from manual input 201, and the acceptable weight range data from manual input 204 are all utilized, in the next step 209, to count the number N of drafts that fall within the acceptable weight range in each predetermined sample number of S drafts. That is, in step 209 the dynamic weight control chassis 104 counts the number N of acceptable drafts, in each predetermined sample of S drafts, that are within the acceptable weight range above and below the target weight that has been set into the system through manual input 204. This information is used to compute an actual pass ratio N/S.

For each sample number S of drafts passing through the system, this actual pass ratio N/S is compared with the desired pass ratio that has been set into the system through the manual input 202. This operation occurs in step 210. Two results are possible from this comparison; the actual pass ratio N/S may exceed the desired pass ratio or it may be less than the desired pass ratio. That is why two outputs are indicated, from step 210 to the next step 211.

Step 211, in the flow chart of FIG. 2, pertains to the recording and adjustment of the target weight, a principal function of the dynamic weight control chassis 104. For this operation, it is necessary to utilize the determinations made in the comparison operation of step 210 together with the target weight adjustment increment data that has been manually entered into the system through input 203. At the outset, the initial target weight is taken as the mid point of the target weight range that has been entered as indicated at 204, this computation of the nominal target weight having been accomplished in step 206.

When the actual pass ratio N/S exceeds the manually entered desired pass ratio from step 202, as determined by the comparison in step 210, the target weight as recorded in step 211 is adjusted downwardly by a given target weight reduction increment established by the manual entry indicated in step 203. As previously noted, this increment may be as small as one or two grams. Conversely, if the actual pass ratio N/S is less than the desired pass ratio, then in step 211 the recorded target weight is increased by an increment. The increments for increase and decrease of the target weight, in step 211, need not be equal. Indeed, it is preferred that the target weight increase increment be larger than the target weight decrease increment. Typically, the target weight increase increment may be twice the target weight decrease increment. If such a ratio is maintained, of course, it is only necessary to enter one target weight adjustment increment in step 203.

For each sample S of drafts passing through station 36 (FIG. 2), dynamic weight control chassis 104 determines the average weight of the actual number of acceptable drafts, those acceptable drafts being the drafts that fall within the target weight range established in step 204. This determination or computation is carried out in step 212, which receives the draft weight data from step 208, the draft count information from step 207, the sample size data from the manual entry step 201, and the maximum and minimum weight data from the manual input of step 204.

The determination of the average weight of the actual acceptable drafts that is effected in step 212 in the flow chart of FIG. 2 is next compared with the adjusted target weight from step 211. This is carried out in step 213. The weight difference information is then utilized, through a correction scaling step 214, to adjust the control weight that is recorded in the primary control chassis of the overall system (FIG. 1). Thus, as shown in FIG. 2, the output 105 from dynamic weight control chassis 104 is supplied to the motor driver circuit 71 for stepper motor 72 in the primary weight control chassis. This adjusts the weight potentiometer 66, upwardly or downwardly, depending on the weight difference from steps 213. Pot 66 is the part of the primary control system that records the control weight utilized as the basis for control of the slicing mechanism 12. As previously noted, the overall control provided by the primary control chassis 60 may correspond to that described in prior U.S. Pat. No. 4,065,911.

From the foregoing description of the left hand portion of the flow chart, FIG. 2, it will be clear that each target weight adjustment increment is a minor fractional part of the acceptable weight range. Typically, it is of the order of one to two grams, or about 0.05 oz. Further, the target weight increase increment is preferably twice the target weight decrease increment. It will be recognized that the target weight determined in step 211 is a dynamic factor that may be adjusted for each sample S of drafts passing through station 36. Furthermore, the adjustments made in the target weight, step 21,, ultimately affect the control weight setting (pot 66) for the primary control system so that the "static" primary control system now functions as a part of an overall dynamic weight control system. It should be noted that the target weight (step 211) and the control weight (potentiometer 66) are closely related and may start out with the same value, but they are not necessarily equal at any point in subsequent operation of the overall system 101.

The right hand side of the flow chart, FIG. 2, pertains to conditions that do not occur in normal functioning of the dynamic weight control system. Thus, these functions may be said to constitute unusual or emergency conditions. To understand this part of FIG. 2, reference should first be made to FIG. 3, which is a bar graph showing the off-weight bands for the dynamic weight control system. It will be remembered that there is a manual input 205 for draft counts for the off-weight bands.

The chart of FIG. 3 shows the acceptable weight band in the center, with the mid point of that band as initially determined in step 206 and the minimum and maximum limits of that band determined by the manual input of step 204 and computation 206 (FIG. 2). For a 16 oz. bacon package the lower limit would be 16 oz. or 454 grams. The mid point may be 462 grams or 16.3 oz. The upper limit may be taken as 16.6 oz. or 470 grams. As previously noted, other ranges may be applied, but the lower limit is always the label weight for the product draft as packaged.

Immediately adjacent the upper and lower limits of the acceptable weight band, as illustrated in FIG. 3, there is an off-weight band 1 indicated as having an overall range of ±0.5 oz. The next adjacent band, band number 2, also has an overall range of plus or minus 0.5 oz., up to a total of one oz. from the acceptable band. Any draft weight that differs from the acceptable weight band by more than one oz. falls in a third band, band number 3, that has no outer limit.

It is possible to set in individual off-weight counts for error determinations for the upper and lower portions of each of the three off-weight bands of FIG. 3. However, such an elaboration of the control arrangement (six settings) is really not necessary. A single off-weight count can be used; typically, this off-weight count, set into the system through step 205 of FIG. 2, may be a small number such as six. That off-weight count number and weight and draft count information from the check weigh station 36 (scale 50A and detector 54) are all utilized in generating an error indication signal upon the occurrence of consecutive non-acceptable weight drafts in any one of the incremental weight bands below and above the acceptable weight range as illustrated in FIG. 3. As noted, preselected limited number may be the same for all of the bands. Determination and generation of the error indication signals is carried out in indication signals, one for each of the off-weight bands shown in FIG. 3. Each error signal is generated only upon the occurrence of a preselected limited number of consecutive non-acceptable draft weights in one of the off-weight bands, the number that is set into the system manually in step 205.

The error signal indicative of the off-weight count of consecutive drafts in band 1, step 222, on first occurrence, is identified in a subsequent step 223. This first generation of an error indication signal for band 1, which is the pair of low- and high-weight bands immediately adjacent the acceptable weight range (FIG. 3) is utilized, in a step 224 (FIG. 2), to interrupt the overall operation of the system for a time interval long enough to effect an auto-tare operation for the scale 50A of the secondary weighing station 36. Thus, the indication of the need for an auto-tare operation for scale 50A and for the apparatus used to perform the off-weight draft count of step 221 is effective for a first generation of an error indication signal in step 222. This is done to make sure that it is not the scale 50A that is causing the error, as might be the case.

It may happen that there is a second generation of an error signal, through functions 221 and 222 of FIG. 2, indicative of the off-weight count of consecutive drafts in the low- or high-weight bands constituting band 1 immediately adjacent the acceptable weight range. Such a second error signal generation for band 1 is identified in step 225. Upon the occurrence of this second error indication signal for band 1, steps 212 and 213 of the dynamic weight control chassis 104 are actuated for immediate performance without waiting for completion of the sample number S of drafts that has been set into the system in step 201, in order to accelerate correction of overall system operation.

In the flow chart of FIG. 2, step 226 comprises the identification of a limited number (the off-weight count) of consecutive drafts in the second low- or high-weight band, band 2. Band 2 is the off-weight band that is displaced by one band from the acceptable weight range as shown in FIG. 3. The error signal generated in step 226 is utilized to afford error information to the operator, as through a warning lamp or other error indication, step 227. In addition, and as indicated by step 228, FIG. 2, action is taken to stop the draft count and weight correction operations in that portion of the dynamic weight control chassis 104 that controls normal system operation. Stated differently, step 228, FIG. 2, indicates an action to inhibit steps 207 and 214, and perhaps others, in dynamic weight control chassis 104.

The slicing and other operations of the overall system are continued despite an error determination in steps 221, 226 and 227 pertaining to the off-weight band 2. The basic information required for off-weight determinations is still being supplied to the apparatus that performs step 221. Consequently, if and when a predetermined number of drafts are found to be within the acceptable weight range, to the second-band error signal of steps 221, 226–228 can be interrupted and normal operation may be resumed. The number of acceptable drafts may be set into the system without operator intervention.

The worst condition applicable tot he functions illustrated in the right hand side of the flow chart, FIG. 2, pertains to generation of a band 3 error signal, indicative of a limited number of consecutive drafts in the third-band, displaced by two bands from the acceptable weight range as shown in FIG. 3. This situation is indicated by steps 229, 230 and 231. From step 230 the operator is informed of the nature of the error (band 3) in the system. By step 231, operation of the entire slicing and weighing system is interrupted through a signal supplied to the primary control chassis on line 107.

FIG. 4 affords a chart illustrative of some of the benefits of the invention. FIG. 4 shows an acceptable weight range with two curves 241 and 242 illustrative of the overall system operations achieved using prior art systems that employ primary control without a secondary dynamic control of the kind afforded by the present invention. Curve 243 illustrates the product draft weight distribution obtained with the overall control system of the present invention. As will be apparent from the curves 241–243, the dynamic control of the present invention, curve 243, affords a substantially higher number of drafts that fall within the acceptable weight range. Moreover, more of those drafts are in the low part of the acceptable range than the high part; weight giveaway is minimized. Drafts below the label weight can of course be corrected by addition of slices. This is also true of drafts above the upper limit of the acceptable weight range, which can be corrected by removal of a slice. It should be noted that the distribution curve 243 afforded by the present invention, with the dynamic weight control that it provides, does not peak at the mid point of the acceptable weight range; it peaks at a lower level so that the overall weight giveaway is substantially reduced.

FIGS. 5A through 5D may be considered in connection with a specific example of setting an operation of the dynamic weight control system of the present invention, based upon the slicing of 16 oz. drafts of bacon. At the outset, the system is set up with 454 grams (16 oz.) as the minimum for the target weight range. The maximum is established as 470 grams (16.6 oz.) so that initial nominal target weight is 462 grams (16.3 oz.). These values are all set into the system through the target weight range input 204 (FIG. 2). The target adjustment increment is set into the system, through input 203, at 0.05 oz. or 2 grams. The sample size S, put into the system through step 201 (FIG. 2) is established at 100 drafts. The desired pass ratio for system operation is set in, input 202, as 70%.

As a first part of consideration of system operation under these conditions, it may be assumed that the system first slices 100 drafts, the sample number S, with the result that the computed average weight in the acceptable weight range is found to be 468 grams (16.5 oz.). For the same initial sample of 100 drafts, the average pass ratio is found to be 60%, which is below the desired pass ratio of 70%.

For these initial conditions, with the actual average pass ratio computed in step 209 less than the desired pass ratio of 70% set into the system in step 202, the dynamic weight control system, particularly the flow chart of FIG. 2, could be expected to make an adjustment to the target draft weight in step 211 by increasing the target weight. However, in the operation of the invention the maximum for the target weight is the value initially set into the system as the mid point of the overall range, through step 206. Consequently, with the target weight already set at the maximum, 462 grams (16.3 oz.) there is no change in the target weight. However, there is a comparison of the average weight from step 212 with the initial target weight and a consequent adjustment of the control weight, via line 105, as described below. These conditions are not illustrated in the drawings.

For the next sample S of 100 packages, it may be assumed that the average draft ascertained in step 212 is 16.3 oz. or 462 grams and that the actual pass ratio N/S in the acceptable weight range is computed as 80%. This is the situation illustrated in FIG. 5A, with the target weight set at 462 grams (16.3 oz.), the mid point of the pass band or acceptable weight range. Because the actual pass ratio is more than the desired pass ratio, the target weight is adjusted downwardly by the adjustment increment of 0.05 oz. or 2 grams. This sets up a new target weight of 460 grams (16.25 oz.), FIG. 5B. With the adjustment of the target weight, the average draft weight is slightly larger than the target weight, the difference being 0.05 oz. or approximately 2 grams. In these circumstances, the weight differential information utilized in step 214, simply translated to meet the operating conditions of motor driver 71 and motor 72 in actuating control weight potentiometer 66, effectively reduces the control weight (pot 66) for the primary system by approximately the same amount as the weight difference, 2 grams.

For the next sample of S drafts, 100 drafts under the postulated conditions, the average weight of drafts in the acceptable range is determined, in step 212, to be 16.35 oz or 463 grams. For this sample, in step 209, the actual pass ratio is determined to be 70%, equal to the desired pass ratio previously set into the system. The system treats this situation as if the actual pass ratio exceeded the desired pass ratio. That is, equal pass ratios for steps 202 and 209 are treated as if the actual pass ratio were more than the desired pass ratio. Of course, the reverse could be programmed into the system. With the postulated conditions, however, and the actual pass ratio exceeding the desired pass ratio as far as the system is concerned, in step 211 the target weight is again adjusted downwardly by the downward adjustment increment of 0.05 oz., approximately 2 grams. Accordingly, the new target weight, for conditions as illustrated in FIG. 5C, is 458 grams or 16.20 oz. This new target weight is compared with the average draft weight, which, as previously noted has been established at 16.35 oz. The difference is 0.15 oz. or approximately 3 grams and this change is made in the control weight potentiometer 66 through step 214 and its actuation of motor driver 71 and motor 72.

In the next sample of 100 drafts, conditions may be such as to drive the target weight down even lower, to the 456 grams or 16.10 oz. shown in FIG. 5D. In the next subsequent sample, it is likely that the actual pass ratio will be appreciably lower than the desired pass ratio. Assuming that the pass ratio is now 60%, thus 10% lower than the desired pass ratio setting, the system will operate to increase the target weight and also the control weight. The control weight, of course, will increase in accordance with actual weight measurements, as described above, and not simply by the increments used in adjusting the target weight. However, in these circumstances the target weight will be increased because the pass ratio for drafts actually within the acceptable range is now too low. With the preferable arrangement discussed above, in which the target weight increase increment is twice that of the target weight decrease increment, the system goes back to the conditions shown in FIG. 5B with a target weight of 460 grams, instead of to the FIG. 5C condition with the target weight at 458 grams.

The use of the intermediate weight adjustment, varying the target weight instead of the ultimate control weight, in the system of the present invention, has several advantages. This arrangement makes it practical to utilize relatively large samples (e.g. 100 drafts or more), minimizing hunting in operation of the system. It avoids direct dynamic modulation of the control weight employed in the primary system to control the actual slicing operation, which again reduces hunting. Furthermore, for those operators who recognize that a maximized pass ratio (e.g. 80% or more) is not the best way to minimize weight giveaway, the system provides important advantages in giveaway reduction by setting the desired pass ratio, step 202 in FIG. 2, at a reduced level. In this regard, it may be pointed out that for a slicing line that has an operational history, the optimum pass ratio may already be known. As an example, an existing line may be known to produce minimum weight giveaway at a pass ratio of 65% instead of the maximum achievable pass ratio, which might be as high as 85%. The reason for this is that the distribution curve is forced closer to the minimum level of the acceptable weight range by the operation of the dynamic system of the invention when operating at a desired pass ratio substantially below maximum, an effect that is best illustrated in FIG. 4. For the automated dynamic weight control of the present invention, in these circumstances, it is best to set the desired pass ratio (step 202) just a small amount above the known optimum pass ratio. That is, for the 65% postulated optimum pass ratio, the system should be set at 67%. Long term, with this setting the system will operate very close to the optimum 65%, occasionally swinging below that level and occasionally moving above it.

FIG. 6 illustrates a limited addition to the dynamic weight control system best illustrated by the flow chart of FIG. 2, an addition that preferably functions at the beginning of operations of the overall slicing apparatus. In the arrangement shown in FIG. 6, which is a supplement to the flow chart of FIG. 2, there is a step 209A that entails computation of a pass ratio for a partial sample, appreciably less than the ordinary sample number of drafts employed in connection with the similar step 209 of FIG. 2. For the modification of FIG. 6, the initial number of drafts, prepared by the slicing system at the beginning of its operation, is taken as a number much smaller than the sample number S. Thus, in a set up in which the sample number S is 100 drafts, as described above, the number of drafts used for the computation of step 209A may be 20. In all other respects, the information necessary to carry out step 209A is the same as for step 209 of FIG. 2. Thus, in step 209A an actual pass ratio is established and that ratio is supplied to a comparison stage 210A that operates in the same way as step 210 of FIG. 2, being supplied with the same desired ratio input 202.

If the actual pass ratio determined by computation in step 209A is within a given amount (i.e., plus or minus 15%) of the desired pass ratio, then the modification of FIG. 6 may have no effect on the overall system operation. However, if the comparison performed in step 210A reveals a differential of more than 15%, either high or low, then a further stage 212A is activated. Function 212A is the same as step 212 of FIG. 2, entailing the computation of an average weight for those drafts in the acceptable range of weights. However, this is being done for the initial small number of drafts, such as 20 drafts, long before the first full sample number S of drafts has been produced in the overall system. Thus, with the modification of FIG. 6, any time the comparison carried out in step 210A shows a differential of more than the selected amount, usually about plus or minus 15%, the steps of adjusting the target weight upwardly or downwardly depending upon the result of the mass ratio comparison, determining the average weight of the drafts in the acceptable weight range, comparing that average weight with the adjusted target weight, and then adjusting the control weight, all as would normally await the completion of a full sample S of drafts, are carried out by the dynamic weight control system.

After each dynamic control function based on S drafts, the system is preferably set up to ignore the next six drafts crossing the check weigh scale 50A. This number may vary somewhat. The delay in resuming the next count and control cycle prevents the system from making corrections on drafts sliced before the new setting of the control weight potentiometer 66 is completed. The invention is not limited to the particular detailed constructions set forth in the specification and illustrated in the accompanying drawings; the same may be modified without departing from the spirit and scope of the invention.

Having thus described the invention, what is claimed is as follows:

1. A method of controlling the slicing of a food product comprising the following steps:
   A. recording a target weight and a related control weight for a multi-slice draft of the product;
   B. advancing a food product into a slicing station at a predetermined feed rate;
   C. slicing the food product, in the slicing station, to produce a series of multi-slice product drafts;
   D. adjusting the feed rate of step B, when necessary, during slicing of each draft, to maintain the total weight of most of the drafts within a preselected permissible weight range above and below the control weight;
   E. weighing each draft after its completion;
   F. counting the number N of acceptable drafts, in a predetermined sample number of S drafts, that are within an acceptable weight range above and below the target weight;
   G. computing an actual pass ratio N/S;
   H. adjusting the target weight downwardly by a target weight reduction increment when the actual pass ratio of step G exceeds a pre-recorded desired pass ratio;
   I. determining the average weight of the actual acceptable drafts in the sample of step F;
   J. comparing the adjusted target weight of step H with the average weight of step I to determine the difference therebetween; and
   K. adjusting the control weight in accordance with the difference from step J.

2. The method of controlling the slicing of a food product, according to claim 1, comprising the additional step of:
   L. adjusting the target weight upwardly by a target weight increase increment when the actual pass ratio of step G is less than the desired pass ratio.

3. The method of controlling the slicing of a food product, according to claim 2, in which each target weight increment is a minor fractional part of the acceptable weight range.

4. The method of controlling the slicing of a food product, according to claim 3, in which the target weight increase increment is twice the target weight decrease increment.

5. The method of controlling the slicing of a food product, according to claim 2, in which the target weight and the control weight are approximately equal.

6. The method of controlling the slicing of a food product, according to claim 2 in which, steps F and G are performed for a preselected initial number of drafts much smaller than S; and, if the actual pass ratio of step G varies from the desired pass ratio by a given amount, then performing steps H through L without going through the sample number S of drafts.

7. The method of controlling the slicing of a food product, according to claim 6, in which the sample number S is about 100 or more, the initial number is about 20, and the given amount is about ±15%.

8. The method of controlling the slicing of a food product, according to claim 2, and comprising the following additional steps:

M. generating an error indication signal upon the occurrence of a preselected limited number of consecutive non-acceptable draft weights, from step E, in any one of at least two successive incremental weight bands below and above the acceptable weight range.

9. The method of controlling the slicing of a food product, according to claim 8, in which, in step M, in response to the first generation of an error indication signal based on a preselected limited number of consecutive drafts in the low- or high-weight band immediately adjacent the acceptable weight range, the slicing operation is interrupted for a time interval long enough for auto-taring of the weighing apparatus used for step E.

10. The method of controlling the slicing of a food product, according to claim 9, in which, in step M, in response to the second generation of an error indication signal based on the preselected limited number of consecutive drafts in the low- or high-weight band immediately adjacent the acceptable weight range, steps H through K are performed immediately, without waiting for completion of S drafts.

11. The method of controlling the slicing of a food product, according to claim 8, in which, in step M, in response to generation of an error indication signal based on a preselected limited number of consecutive drafts in the second low- or high-weight band displaced by one band from the acceptable weight range, an alarm indication is produced for the operator and step K is interrupted but other steps of the method continue.

12. The method of controlling the slicing of a food product, according to claim 11 in which, after generation of a second-band error signal, a predetermined number of drafts, much smaller than S, are found to be within the acceptable weight range, where upon the error signal is interrupted and control step K is resumed.

13. The method of controlling the slicing of a food product, according to claim 8, in which, in step M, in response to generation of an error indication signal based on a preselected limited number of consecutive drafts in a third low- or high-weight band displaced by two bands from the acceptable weight range, the entire slicing operation is shut down.

14. The method of controlling the slicing of a food product, according to claim 2, including the additional step of discontinuing control for a predetermined small number of drafts between successive samples of S drafts.

15. A dynamic weight control system for a slicing machine of the kind comprising a slicing station for slicing a food product to produce a series of multi-slice product drafts, feed means for feeding a food product into the slicing station at a given feed rate, control weight means for recording a control weight for a product draft, and a primary weight control, including primary weighing means, for controlling the feed means to maintain the weights of most of the drafts in a predetermined permissible weight range above and below the control weight, the dynamic weight control system comprising:

secondary weighing means for weighing each draft after its completion;

computer means, connected to the secondary weighing means, for:

(a) recording a target weight for a product draft, which target weight is related to the control weight;

(b) determining the number N of acceptable drafts, in a predetermined sample number S of drafts, that are actually within a predetermined acceptable weight range above and below the target weight;

(c) computing an actual pass ratio N/S;

(d) comparing that actual pass ratio with a pre-recorded desired pass ratio;

(e) adjusting the target weight downwardly by a target weight reduction increment when the comparison indicates that the actual pass ratio exceeds a pre-recorded desired pass ratio;

(f) determining the average weight of the acceptable drafts in the sample;

(g) and comparing the adjusted target weight of step (e) with the average weight of step (f) to generate a weight difference signal indicative of the difference therebetween; and control weight adjustment means, connected to the computer means and to the control weight means, for adjusting the control weight in accordance with the difference signal.

16. A dynamic weight control system for a food product slicing machine, according to claim 15, in which the computer means also adjusts the target weight upwardly by a target weight increase increment when the actual pass ratio is less than the desired pass ratio.

17. A dynamic weight control system for a food product slicing machine, according to claim 16, in which the dynamic weight control system discontinues operation for a limited number of drafts between successive samples of S drafts.

18. A dynamic weight control system for a food product slicing machine, according to claim 17, in which the limited number of drafts between successive samples is about six.

19. A dynamic weight control system for a food product slicing machine, according to claim 16, in which each target weight increment is a minor fractional part of the acceptable weight range.

20. A dynamic weight control system for a food product slicing machine, according to claim 19 in which the target weight increase increment is twice the target weight decrease increment.

21. A dynamic weight control system for a food product slicing machine, according to claim 20, in which the target weight and the control weight are approximately equal.

22. A dynamic weight control system for a food product slicing machine, according to claim 16, in which the target weight and the control weight are approximately equal.

23. A dynamic weight control system for a food product slicing machine, according to claim 16, in which the computer further comprises means, operational on startup for (i) performing steps (b), (c) and (d) for a preselected initial number of drafts much smaller than S;

and, if the actual pass ratio varies from the desired pass ratio by a given amount, then performing computer steps (e) through (g) without going through the sample number S of drafts.

24. A dynamic weight control system for a food product slicing machine, according to claim 23, in which the sample number S is about 100 or more, the initial number is about 20, and the given amount is ±15%.

25. A dynamic weight control system for a food product slicing machine, according to claim 16, and in which the computer further comprises means for:
(j) generating an error indication signal upon the occurrence of a preselected limited number of consecutive non-acceptable draft weights, from the secondary weighing means, in any one of at least two successive incremental weight bands below and above the acceptable weight range.

26. A dynamic weight control system for a food product slicing machine, according to claim 25, and further comprising:
system interruption means, responsive to the first error indication signal from the computer based on a preselected limited number of consecutive drafts in the low-or high-weight band immediately adjacent the acceptable weight range, for interrupting operation of the slicing system for a time interval long enough for auto-taring of the second weighing means.

27. A dynamic weight control system for a food product slicing machine, according to claim 26, in which the computer means includes means, operational in its step (j), in response to the second generation of an error indication signal based on a preselected limited number of consecutive drafts in the low- or high-weight band immediately adjacent the acceptable weight range, for performing computer steps (e) through (g) immediately, without waiting for completion of S drafts.

28. A dynamic weight control system for a food product slicing machine, according to claim 25, in which the computer further comprises means for generating an error signal based on a preselected limited number of consecutive drafts in the second low- or high-weight band displaced by one band from the acceptable weight range; and the system further comprises means for producing an alarm indication for the operator and means for interrupting operation of the control weight adjustment means in response to that error signal.

29. A dynamic weight control system for a food product slicing machine, according to claim 28, in which the dynamic control system further comprises reset means, operational after generation of a second-band error signal and in response to a predetermined number of drafts within the acceptable weight range, for interrupting the error signal.

30. A dynamic weight control system for a food product slicing machine, according to claim 25 in which the system further comprises shut down means, responsive to generation of an error indication signal based on a preselected limited number of consecutive drafts in a third low- or high-weight band displaced by two bands from the acceptable weight range, for shutting down the slicing machine.

* * * * *

UNITED STATES PATENT AND TRADEMARK OFFICE
CERTIFICATE OF CORRECTION

PATENT NO. : 5,109,936

DATED : May 5, 1992

INVENTOR(S) : Robert F. Ruppel

It is certified that error appears in the above-identified patent and that said Letters Patent is hereby corrected as shown below:

Abstract, line 16, substitute --used-- for "ueed";
          line 17, substitute --secondary-- for "second";
Column 1, line 16, between "conditions" and "The" insert a period --.--;
          line 27, substitute --focuses-- for "focusses";
Column 3, line 53, substitute --No.-- for "Nos.";
          line 59, substitute --No.-- for "Nos.";
Column 8, line 67, substitute --211-- for "21";
Column 9, line 52, between "noted," and "preselected" insert --a--;
          line 54, between "in" and "indication" insert --a step 211, Fig. 2. Actually there are--;
Column 10, line 49, substitute --to the-- for "tot he";
Column 16, line 48, between "19" and "in" insert a comma --,--;
Column 18, line 22, between "25" and "in" insert a comma --,--.

Signed and Sealed this

Twenty-first Day of September, 1993

Attest:

*Attesting Officer*

BRUCE LEHMAN

*Commissioner of Patents and Trademarks*